US00RE42929E

(19) United States
(12) Reissued Patent
Canterbury et al.

(10) Patent Number: US RE42,929 E
(45) Date of Reissued Patent: Nov. 15, 2011

(54) GAMING DEVICE WITH A SERIAL CONNECTION

(75) Inventors: Stephen A. Canterbury, Antioch, IL (US); Timothy C. Loose, Chicago, IL (US)

(73) Assignee: WMS Gaming Inc., Waukegan, IL (US)

(21) Appl. No.: 10/214,299

(22) Filed: Aug. 7, 2002

Related U.S. Patent Documents

Reissue of:
(64) Patent No.: 6,117,010
Issued: Sep. 12, 2000
Appl. No.: 09/368,739
Filed: Aug. 5, 1999

(51) Int. Cl.
*A63F 13/00* (2006.01)

(52) U.S. Cl. ..... 463/20

(58) Field of Classification Search ..... 463/4, 20, 463/36; 273/237; 194/219; 312/291
See application file for complete search history.

(56) References Cited

U.S. PATENT DOCUMENTS

| | | | | | |
|---|---|---|---|---|---|
| 4,648,063 | A | | 3/1987 | Strout | 364/900 |
| 4,652,998 | A | | 3/1987 | Koza et al. | 364/412 |
| 5,074,559 | A | | 12/1991 | Okada | 273/143 R |
| 5,169,147 | A | | 12/1992 | Hamano | 273/138 A |
| 5,342,047 | A | * | 8/1994 | Heidel et al. | 463/29 |
| 5,379,382 | A | | 1/1995 | Work et al. | 395/275 |
| 5,443,880 | A | * | 8/1995 | Wike | 428/78 |
| 5,519,669 | A | * | 5/1996 | Ross et al. | 367/93 |
| 5,643,086 | A | | 7/1997 | Alcorn et al. | 463/29 |
| 5,695,188 | A | * | 12/1997 | Ishibashi | 273/143 R |
| 5,704,835 | A | * | 1/1998 | Dietz, II | 463/20 |
| 5,708,838 | A | | 1/1998 | Robinson | 395/800 |
| 5,738,583 | A | * | 4/1998 | Comas et al. | 463/40 |
| 5,745,160 | A | * | 4/1998 | Ishida et al. | 348/14.09 |
| 5,761,647 | A | | 6/1998 | Boushy | 705/10 |
| 5,785,595 | A | | 7/1998 | Gauselmann | 463/20 |
| 5,800,268 | A | * | 9/1998 | Molnick | 463/40 |
| 5,839,957 | A | | 11/1998 | Schneider et al. | 463/20 |
| 5,938,196 | A | | 8/1999 | Antoja | 273/143 C |
| 5,938,529 | A | | 8/1999 | Rodesch et al. | 463/20 |
| 5,951,397 | A | * | 9/1999 | Dickinson | 463/36 |
| 5,958,020 | A | | 9/1999 | Evoy et al. | 710/3 |
| 5,959,596 | A | * | 9/1999 | McCarten et al. | 345/2.1 |

(Continued)

OTHER PUBLICATIONS

Applicants' Provided Prior Art shown in FIGS. 1-2 of current application.

(Continued)

*Primary Examiner* — Gene Kim
*Assistant Examiner* — Dolores Collins
(74) *Attorney, Agent, or Firm* — Nixon Peabody LLP

(57) ABSTRACT

A gaming device comprising a cabinet, a door, a game control unit, a printed circuit board and an input/output microcontroller. The door is hingedly connected to the cabinet. The game control unit is housed within the cabinet. The printed circuit board is mounted to the door and disposed inside the cabinet. The printed circuit board carries a plurality of light sources and a plurality of switches switchable between an actuated condition and a non-actuated condition. The input/output microcontroller, which performs many of the functions conventionally performed by the game control unit, is mounted to the printed circuit board and connected to the game control unit by a serial link. The microcontroller is coupled to the switches to inform the game control unit of the condition of each of the switches. The microcontroller is coupled to the light sources to turn the light sources on and off.

14 Claims, 5 Drawing Sheets

U.S. PATENT DOCUMENTS

| | | | | |
|---|---|---|---|---|
| 5,978,920 | A | 11/1999 | Lee | 713/202 |
| 6,003,867 | A | 12/1999 | Rodesch et al. | 273/143 R |
| 6,068,552 | A | 5/2000 | Walker et al. | 463/21 |
| 6,071,190 | A | 6/2000 | Weiss et al. | 463/25 |
| 6,088,802 | A | 7/2000 | Bialick et al. | 713/200 |
| 6,104,815 | A | 8/2000 | Alcorn et al. | 380/251 |
| 6,106,396 | A | 8/2000 | Alcorn et al. | 463/29 |
| 6,117,010 | A | 9/2000 | Canterbury et al. | 463/20 |
| 6,135,887 | A | 10/2000 | Pease et al. | 463/42 |
| 6,141,805 | A * | 11/2000 | Fisher-Cohen et al. | 5/420 |
| 6,149,522 | A | 11/2000 | Alcorn et al. | 463/29 |
| 6,202,235 | B1 * | 3/2001 | Salhanick | 5/653 |
| 6,203,430 | B1 | 3/2001 | Walker et al. | 463/20 |
| 6,251,014 | B1 | 6/2001 | Stockdale et al. | 463/16 |
| 6,276,828 | B1 * | 8/2001 | Otley et al. | 383/4 |
| 6,394,900 | B1 | 5/2002 | McGlone et al. | 463/20 |
| 6,588,840 | B1 * | 7/2003 | Lombardo | 297/228.12 |
| 6,641,484 | B2 * | 11/2003 | Oles et al. | 463/47 |
| 6,952,845 | B1 * | 10/2005 | Akkad | 5/419 |

OTHER PUBLICATIONS

Merriam-Webster's Collegiate® Dictionary, Merriam-Webster, Incorporated, Tenth Edition (1993).

The Superior Electric Company, Catalog DCM 1078-1 for "Slo-Syn® DC Stepping Motors," 20 pages (1985).

The Superior Electric Company, advertisement for "Motion Control," Electronics Magazine, 1 page (Aug. 21, 1986).

The Superior Electric Company, Technical Paper 80 MB-1 for "Step Motor, Control And Load Interaction In A Step Motor System," 20 pages (1980).

Merriam-Webster—Webster's Collegiate Dictionary 10th Edition, 1993.

* cited by examiner

GAMING DEVICE WITH A SERIAL CONNECTION

Matter enclosed in heavy brackets [ ] appears in the original patent but forms no part of this reissue specification; matter printed in italics indicates the additions made by reissue.

FIELD OF THE INVENTION

The present invention relates generally to gaming devices, and more particularly, to a configuration which reduces the wiring within the gaming device and increases the overall speed of the gaming device.

BACKGROUND OF THE INVENTION

FIGS. 1 and 2 depict a prior art configuration within a gaming device which, in this case, is a slot machine. The slot machine includes a cabinet 10 having a hinged door 12. A button panel 14 supporting a plurality of button assemblies 15 is mounted to the door 12 below a rectangular opening 16 that exposes a video display 18 when the door 12 is closed (FIG. 1). When the slot machine is operating, the video display 18 depicts a plurality of slot reels 20. To play the slot machine, a player places a wager and then "spins" the slot reels 20. In response to a winning combination appearing on an active pay line(s) of the slot reels 20, the slot machine pays out a monetary amount determined by a pay table listing the winning combination.

The button assemblies 15 on the button panel 14 are electrically connected to a game control unit (not shown) inside the belly of the slot machine by a plurality of electrical wires 22. A player may press various ones of the button assemblies 15 to cause the game control unit to perform various functions, such as cash out, select pay lines, display the pay table on the video display 18, enter a wager, and spin the reels. Each button assembly 15 typically includes a variety of elements, such as a button, an actuator, a switch, and a light source. The actuator, switch, and light source are generally positioned beneath the button. The actuator is coupled to the button and disposed to actuate the switch in response to pressing the button. The light source is positioned to illuminate the button.

The game control unit monitors the button assemblies 15 to determine whether the buttons have been actuated. In addition, the game control unit debounces the switches and refreshes the light sources in the button assembly. The game control unit also determines the outcome of the slot machine and controls the video display. Because the game control unit must perform a number of functions nearly simultaneously, the speed at which the game control unit performs these functions is limited.

The process for manufacturing the slot machine in FIGS. 1 and 2 includes the following sequence of steps: (1) the button assemblies 15 are individually mounted to the button panel 14, (2) the electrical wires 22 are connected to appropriate ones of the button assemblies 15, (3) the button panel 14 is mounted to the door 12, and (4) the electrical wires 22 are fed through the belly of the slot machine and connected to the game control unit. Thus, the button panel 14, button assemblies 15, and electrical wires 22 are built as a sub-assembly prior to mounting the button panel 14 to the door 12. This manufacturing technique has several drawbacks.

One drawback is that when the button panel 14 is mounted to the door 12, there is a significant possibility that one of the electrical wires 22 will be pinched between the button panel 14 and the door 12. Another drawback is that the wire side of the button assemblies 15 will become buried within the cluster of electrical wires 22 that are left under the button panel 14 (FIG. 2). This makes it difficult for a service technician to access any of the button assemblies 15 for maintenance or servicing (e.g., replacing burnt-out light sources). Yet another drawback is that conversion of the slot machine to a different game requiring a different button configuration is difficult. To perform such conversion, the original sub-assembly comprised of the button panel 14, the button assemblies 15, and the electrical wires 22 must be removed from the slot machine and replaced with a suitable new sub-assembly with the different button configuration. This requires a service technician to reach inside the slot machine and disconnect the original electrical wires 22 from the game control unit, detach the button panel 14 from the door 12, mount the new sub-assembly to the door 12, and feed the electrical wires 22 through the belly of the slot machine for connection to the game control unit.

A cost-effective button panel assembly that facilitates future modifications is the subject of U.S. patent application Ser. No. 09/351,776 (hereinafter "application"), filed Jul. 12, 1999, assigned to the assignee of the present invention and incorporated herein by reference. The 776 application discloses an embodiment wherein a printed circuit board is mounted to the door of a game control unit. The inclusion of the printed circuit board solves many of the drawbacks outlined above; however, a plurality of wires remain within the gaming device connecting the button assemblies to the game control unit.

Accordingly, there is a need for a new design within the gaming device that overcomes the aforementioned shortcomings.

SUMMARY OF THE INVENTION

In accordance with one aspect of the present invention, a gaming device comprises a game control unit, a printed circuit board and an input/output microcontroller. The printed circuit board carries a plurality of light sources and a plurality of switches switchable between an actuated condition and a non-actuated condition. The input/output microcontroller is mounted to the printed circuit board. Because the microcontroller performs many of the functions conventionally performed by the game control unit, the game control unit processes data quicker, thus increasing the speed of the overall game. The microcontroller is connected to the game control unit by a serial link, thus reducing the wiring between the printed circuit board and the game control unit. The input/output microcontroller is coupled to the switches to inform the game control unit of the condition of each of the switches. The microcontroller is coupled to the light sources to turn the light sources on and off.

The above summary of the present invention is not intended to represent each embodiment, or every aspect of the present invention. This is the purpose of the figures and detailed description which follow.

BRIEF DESCRIPTION OF THE DRAWINGS

Other objects and advantages of the invention will become apparent upon reading the following detailed description and upon reference to the drawings in which.

Figure 1:
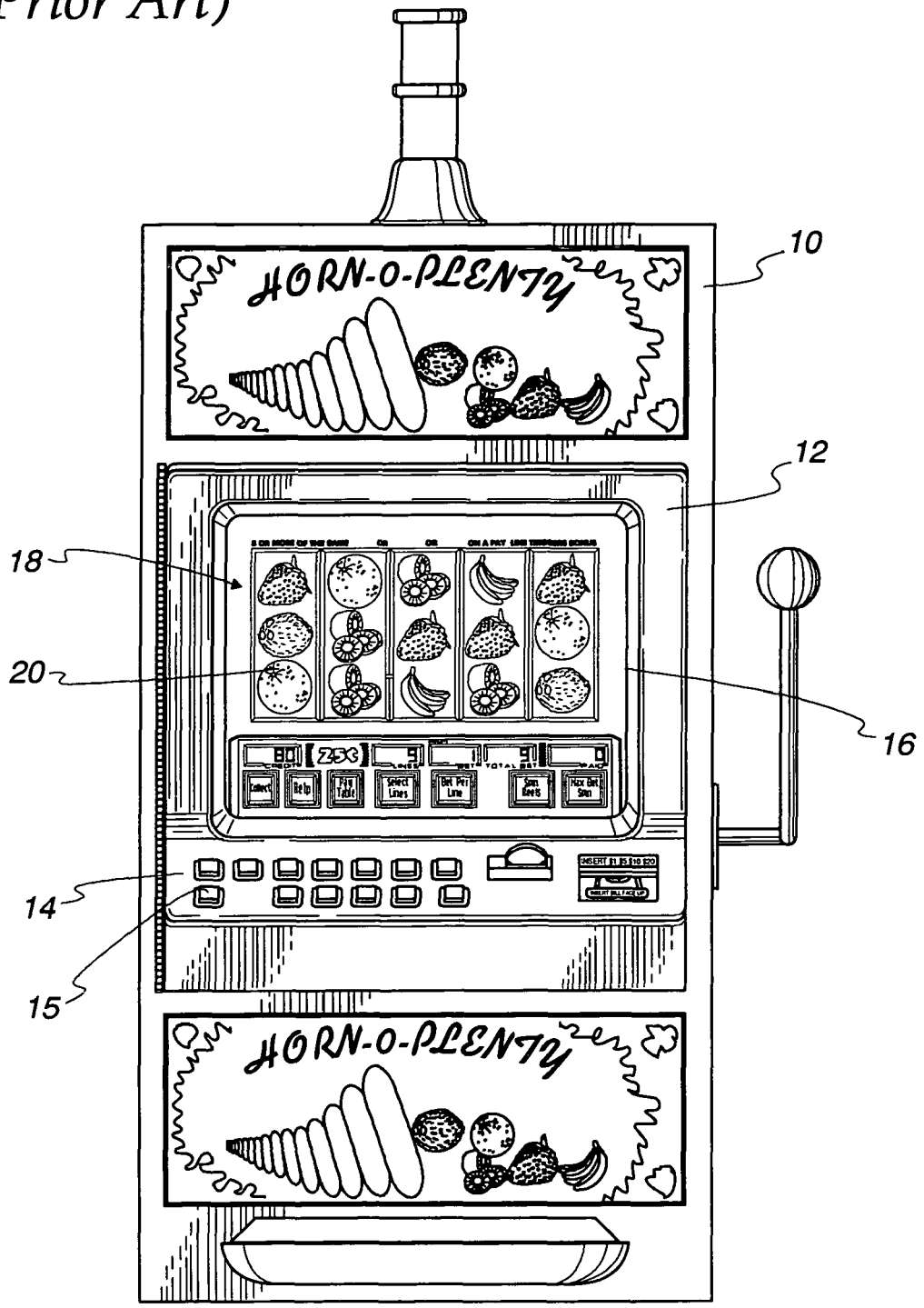
Fig. 1 (Prior Art)
FIG. 1 is a front view of a prior art gaming device.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the intention is to cover all modifications, equivalents and alternatives falling within the spirit and scope of the invention as defined by the appended claims.

DESCRIPTION OF ILLUSTRATIVE EMBODIMENTS

Figure 2:
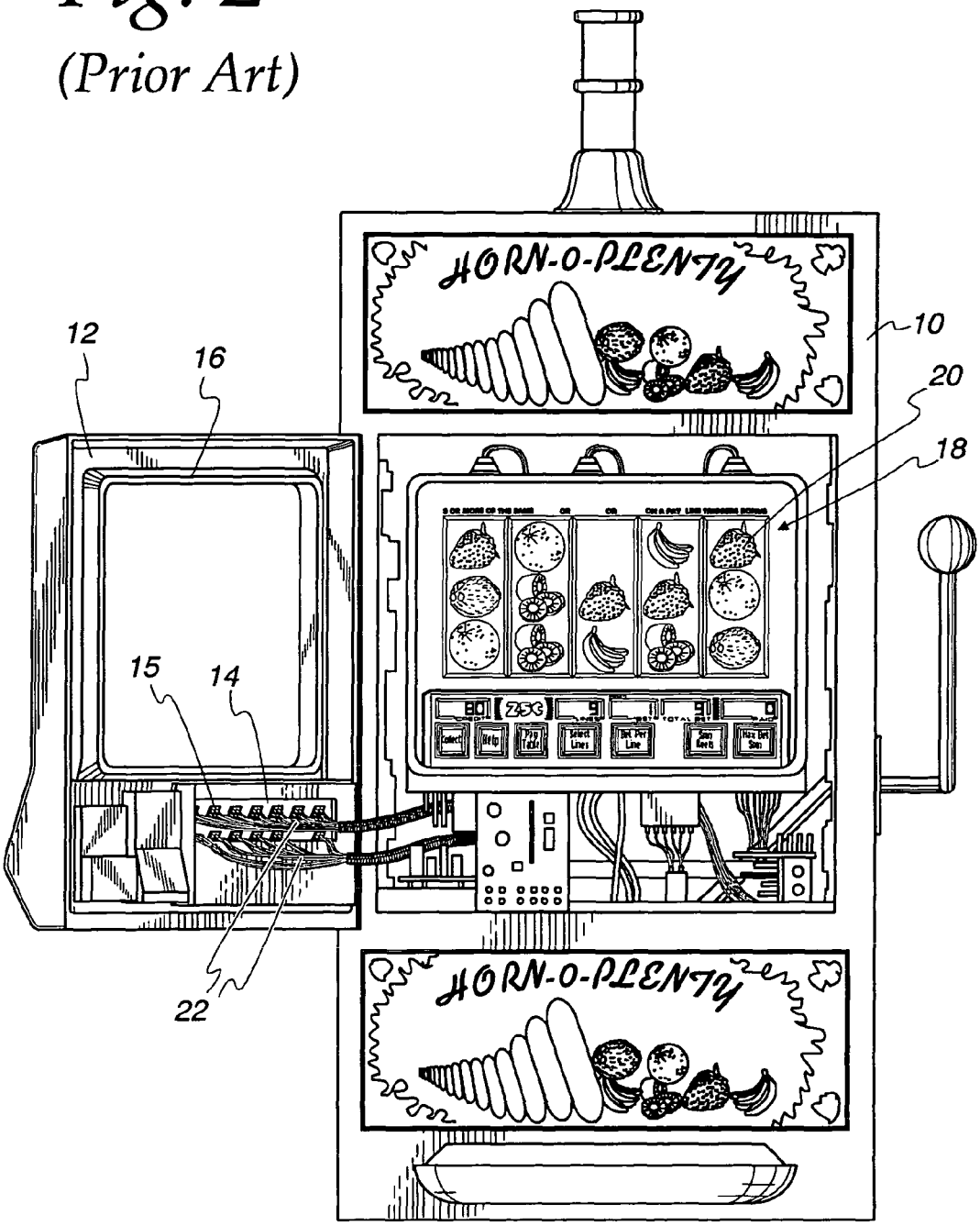
Fig. 2 (Prior Art)
FIG. 2 is a front view of the gaming device of FIG. 1 with the door in the open position.
Figure 3:
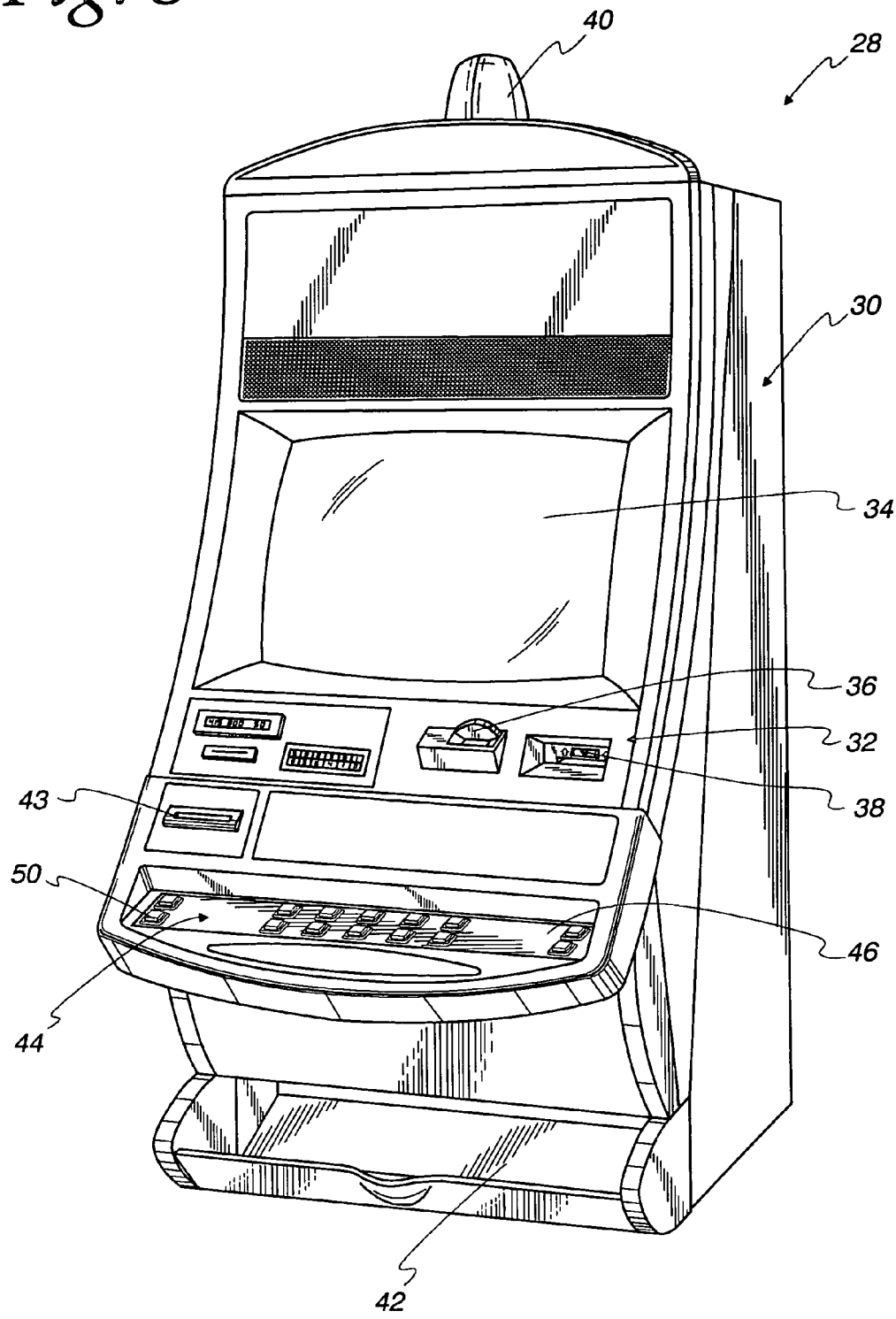
FIG. 3 is a perspective view of a gaming device in accordance with the present invention.

FIG. 3 depicts a gaming device 28 in accordance with the present invention. The gaming device 28 may, for example, be a slot machine, a video lottery terminal, or any other machine on which a player places a wager on a game of chance for an opportunity to win some sort of monetary or non-monetary prize. The illustrated gaming device 28 includes a cabinet 30 having a hinged door 32. The hinged door 32 includes a rectangular opening that exposes a video display 34 when the door is closed. When the gaming device 28 is operating, the video display 34 depicts a game of chance, which may, for example, include a plurality of slot reels of the type shown in FIGS. 1 and 2. Beneath the video display 34 are a coin acceptor 36 and a bill acceptor 38 for receiving wagers. The gaming device 28 illuminates a light 40 in response to a win occurring on the game of chance and dispenses payouts resulting from the win to a coin tray 42 and a bill hopper 43. Also, the light 40 may be illuminated to indicate an error condition or a request for service. A button panel system 44 is mounted to the door 32 beneath the coin and bill acceptors 36 and 38.

Figure 4:
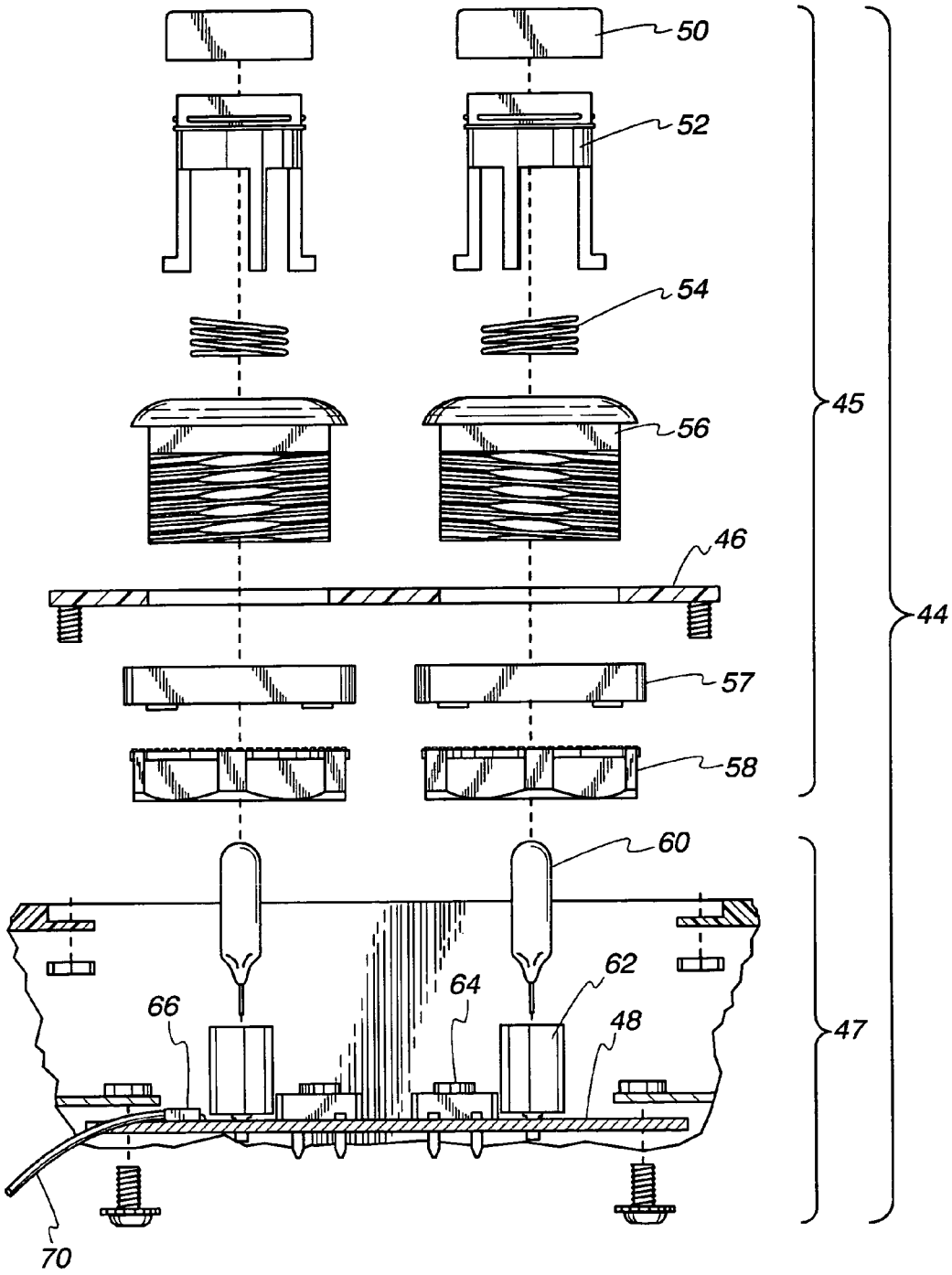
FIG. 4 is an exploded side view of a button panel system.

FIG. 4 depicts an exploded view of the button panel system 44. The button panel system 44 includes a button panel assembly 45 and a printed circuit board assembly 47. The button panel assembly 45 includes a button panel 46 and actuator assemblies 50, 52, 54, 56, 58, while the printed circuit board assembly 47 includes a printed circuit board 48, switch assemblies 60,62,64, and an input/output (I/O) microcontroller 66. A serial link 70 extends from the I/O microcontroller 66. The actuator assemblies 50,52,54,56,58 are assembled on the button panel 46, while the switch assemblies 60,62,64 are assembled on the printed circuit board 48.

Each actuator assembly includes a lens 50, an actuator 52, a compression spring 54, a bezel 56, an optional plastic spacer 57, and a plastic nut 58. When the button panel assembly 45 is assembled, the compression spring 54 is contained within the bezel 56 between a lower shelf formed by the bezel 56 and an upper square portion of the actuator 52. In the illustrated embodiment, the actuator 52 includes the upper square portion and three arms extending downward from the upper square portion. It is contemplated, however, that the actuator 52 may have various other forms, so long as the actuator 52 is capable of actuating the switch 64. When the button panel assembly 45 is assembled, the lens 50 is secured to the upper square portion of the actuator 52 and extends upward above the bezel 56. The lens 50 contains a printed label describing the function of the associated button and is the portion of the button pressed by a player to cause the gaming device 28 to perform that function. The lens 50 also serves to diffuse light emitted by a light source 60, which is one of the components of the switch assembly 60,62,64 connected to the printed circuit board 48. The bezel 56 is inserted into a corresponding aperture formed by the button panel 46 and is secured to the button panel 46 by the nut 58, which is threadably engaged to a threaded outer surface of the bezel 56 below the spacer 57. The spacer 57 may be located immediately beneath the button panel 46, as shown, or may alternatively be located immediately above the button panel 46 to raise the button further above the button panel 46. To retain the actuator 52 within the actuator assembly 50,52,54,56,58 and thereby prevent removal thereof, the lowermost ends of the respective arms of the actuator 52 are turned outward such that these ends abut a lowermost surface of the bezel 56 when the lens 50 has not been pressed.

Each switch assembly 60,62,64 includes a light source 60, a socket 62 and a switch 64. Because the socket 62 and the switch 64 are soldered to the printed circuit board 48, these components are depicted in the drawings as already being attached to the printed circuit board 48. When the printed circuit board assembly 47 is assembled, the light source 60 is secured within the socket 62 which, in turn, is secured to the printed circuit board 48. Although the light source 60 is shown connected to the printed circuit board 48 by a socket 62, the light source 60 may be connected directly to the printed circuit board 48. The light source may be a lamp, a light-emitting diode, or another suitable source of light. The upper square portion of the actuator 52 forms an aperture to allow light from the light source 60 within the socket 62 to pass therethrough and illuminate the lens 50. The switch 64 is secured to the printed circuit board 48 at a location adjacent to the socket 62 and beneath one of the arms of the actuator 52. Although the switch 64 is illustrated as a "pancake-type" mechanical switch, it is contemplated that the switch 64 may take various other forms, such as a proximity switch or an optical switch.

Figure 5:
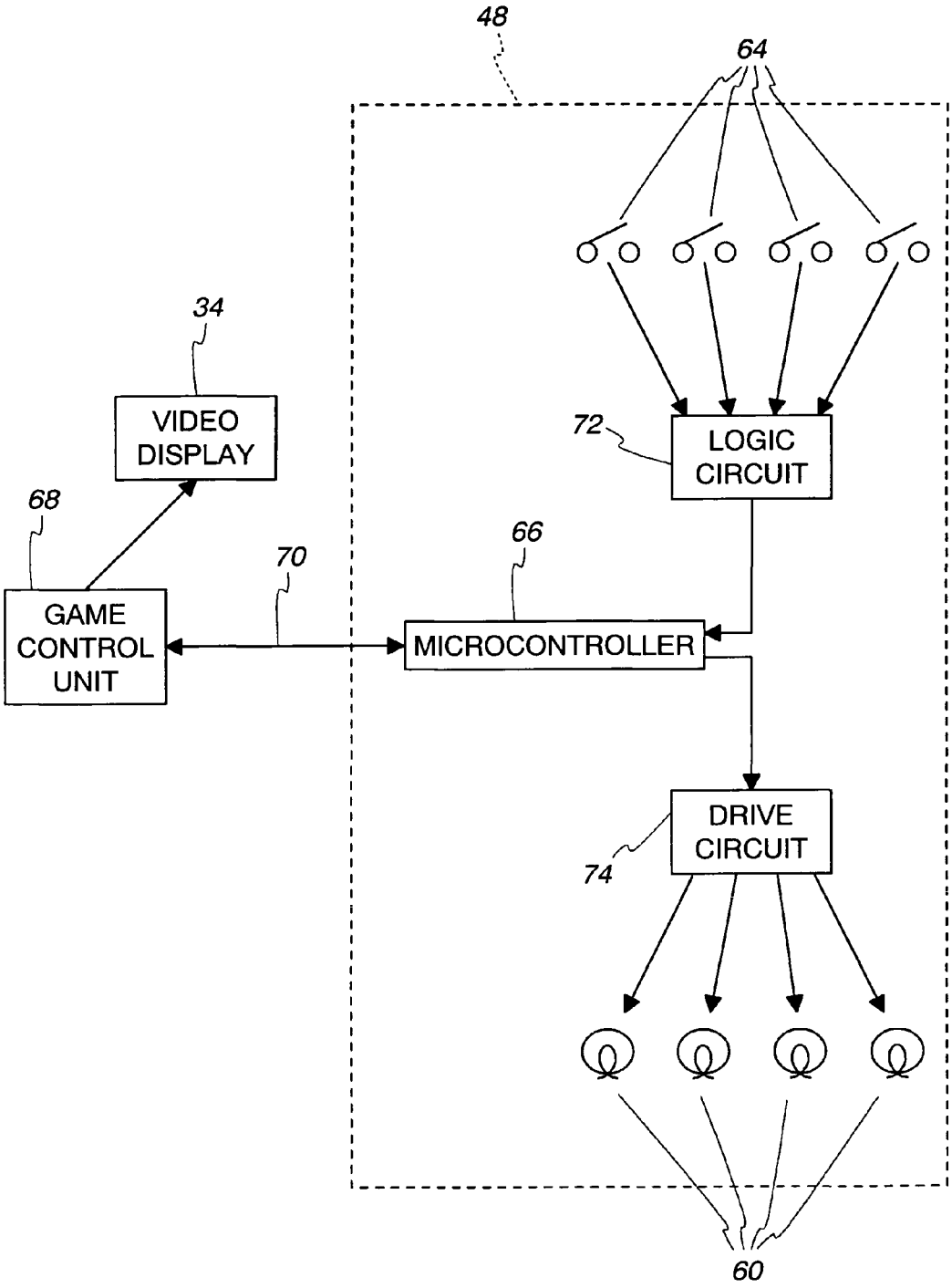
FIG. 5 is a block diagram of the gaming device of FIG. 3.

FIG. 5 is a block diagram of the gaming device 28 of FIG. 3. The gaming device 28 comprises the printed circuit board 48, an input/output (I/O) microcontroller 66 and a game control unit 68. The game control unit 68 is housed within the cabinet 30. The printed circuit board is mounted to the door 32 of the gaming device 28, and is disposed inside the cabinet 30. The I/O microcontroller 66 is mounted on the printed circuit board 48, and is connected to the game control unit 68 by a serial link 70. The serial link 70 comprises a single cable, which replaces the plurality of wires 22 in conventional gaming devices. Examples of suitable serial links 70 are a universal serial bus, RS-232, RS-485 or Ethernet link.

The printed circuit board 48 carries the plurality of switches 64 and the plurality of light sources 60. The switches 64 are switchable between an actuated condition and a non-actuated condition. The microcontroller 66 is coupled to the switches 64 by a logic circuit 72. The logic circuit 72 interacts with the I/O microcontroller 66, determines which switches 64 are in the actuated condition, and sends the information to the I/O microcontroller 66, which, in turn, informs the game control unit 68 of the condition of each of the switches 64. The I/O microcontroller 66 is coupled to the light sources 60 by a drive circuit 74. Although shown as a separate entity, the drive circuit 74 may also be part of the microcontroller 66. The microcontroller 66 determines which light sources 60 should be on, and in turn signals the drive circuit 74 to illuminate the respective light sources 60. The logic circuit 72 and the drive circuit 74 are mounted on the printed circuit board 48.

The I/O microcontroller 66 performs many of the functions conventionally performed by the game control unit 68. For example, the I/O microcontroller 66 continuously scans each of the switches 64 to determine whether each switch 64 is in the actuated or non-actuated condition. In addition, the I/O microcontroller 66 debounces each switch 64 to filter the transient noise from the switching signal before it reaches steady state. Finally, the microcontroller 66 continuously refreshes the light sources 60 via the drive circuit 74 to make it appear, to the naked eye, as though the light sources 60 are always illuminated. When the game control unit 68 needs to determine the configuration and function of the switches 64, rather than scanning each of the switches 64, it merely acquires this information from the I/O microcontroller 66, thus simplifying game setup. The printed circuit board 48 may include a plurality of jumpers or dip switches (not shown) for identifying the printed circuit board configuration and functions to the microcontroller 66. Further, under the direction of the game control unit 68, the I/O microcontroller 66 performs diagnostic tests on the printed circuit board 48 to assist in troubleshooting and ensure proper operation during start-up.

The game control unit 68 is the main controller of the gaming device 28. Accordingly, the game control unit 68 determines the outcome of the gaming device 28, and, thus, ultimately controls the video display 34. The inclusion of the I/O microcontroller 66 removes the need for the game control unit 68 to perform the aforementioned functions now performed by the microcontroller 66, thereby allowing the game control unit 68 to process data quicker and increase the speed of the overall game.

Providing a serial link 70 between the I/O microcontroller 66 and the game control unit 68 reduces the amount of wiring between the button panel assembly 44 and the game control unit 68. This reduces the cost to manufacture the gaming device 28, improves the reliability of the gaming device 28, and facilitates future modifications to the button panel assembly 44. Examples of suitable microcontrollers for the present invention are Cypress Universal Serial Bus microcontrollers, manufactured by Cypress Semiconductor Corp., and C541U Family Multipurpose Microcontroller with On-Chip USB Module, manufactured by Siemens AG. ST Microelectronics also manufactures suitable microcontrollers for the present invention.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming device comprising:

a game control unit;

a printed circuit board carrying a plurality of switches switchable between an actuated condition and a non-actuated condition; and an input/output microcontroller mounted to said printed circuit board and connected to said game control unit by a serial link, said microcontroller being coupled to said switches to inform said game control unit of the condition of each of said switches.

2. The gaming device of claim 1, wherein said serial link comprises a universal serial bus, RS-232, RS-485 or Ethernet link.

3. The gaming device of claim 1, further comprising:

a button panel mounted in proximity to said printed circuit board;

a plurality of buttons mounted to said button panel; and a plurality of actuators coupled to said respective buttons and disposed to actuate said respective switches in response to pressing said respective buttons.

4. The gaming device of claim 1, wherein said microcontroller scans said switches to determine whether each of said switches is in the actuated or non-actuated condition.

5. The gaming device of claim 1, wherein said microcontroller debounces said switches.

6. The gaming device of claim 1, further comprising:

a light source mounted on said printed circuit board, wherein said microcontroller determines when to illuminate said light source.

7. The gaming device of claim 6, wherein said microcontroller refreshes said light source.

8. A gaming device comprising:

a cabinet;

a door hingedly connected to said cabinet;

a game control unit housed within said cabinet;

a printed circuit board mounted to said door and disposed inside said cabinet, said printed circuit board carrying a plurality of light sources and a plurality of switches switchable between an actuated condition and a non-actuated condition; and an input/output microcontroller mounted to said printed circuit board and connected to said game control unit by a serial link, said microcontroller being coupled to said switches to inform said game control unit of the condition of each of said switches, said microcontroller being coupled to said light sources to turn said light sources on and off.

9. The gaming device of claim 8, wherein said serial link comprises a universal serial bus, RS-232, RS-485 or Ethernet link.

10. The gaming device of claim 8, further comprising:

a button panel mounted to said door in proximity to said printed circuit board;

a plurality of buttons mounted to said button panel; and a plurality of actuators coupled to said respective buttons and disposed to actuate said respective switches in response to pressing said respective buttons.

11. The gaming device of claim 8, wherein said microcontroller scans said switches to determine whether each of said switches is in the actuated or non-actuated condition.

12. The gaming device of claim 8, wherein said microcontroller debounces said switches.

13. The gaming device of claim 8, wherein said microcontroller refreshes said light sources.

14. A gaming device comprising:

a cabinet;

a door hingedly connected to said cabinet;

a game control unit housed within said cabinet;

a printed circuit board mounted to said door and disposed inside said cabinet, said printed circuit board carrying a plurality of light sources and a plurality of switches switchable between an actuated condition and a non-actuated condition; and microprocessor means for scanning and debouncing said switches, informing said game control unit of the condition of each of said switches, turning said light sources on and off, and refreshing said light sources, said microprocessor means being mounted to said printed circuit board and connected to said game control unit by a serial link.

* * * * *